United States Patent Office 2,955,015
Patented Oct. 4, 1960

2,955,015

GRAFT POLYMERIZATION OF CERTAIN ESTERS OF ACRYLIC ACID WITH CELLULOSE SUBSTRATE

Nicholas R. Segro, Glenbrook, and John H. Daniel, Jr., Old Greenwich, Conn., assignors to American Cyanamid Company, New York, N.Y., a corporation of Maine No Drawing. Filed June 5, 1957, Ser. No. 663,610

10 Claims. (Cl. 8—116)

This invention relates to novel plastic products and to the method for preparing same. Still further, this invention relates to the grafting of certain ethylenically unsaturated compounds onto cellulose paper substrates thus providing a class of self-supporting sheets which are essentially polymers of said ethylenically unsaturated compounds of varied and indeterminate polymeric lengths bonded by interaction to the cellulose paper substrate. More specifically, this invention concerns plastic products resulting from the graft polymerization of the ethyl, butyl and propyl esters of acrylic acid with a cellulose paper substrate in an aqueous medium at a pH of not greater than 3.5 and in the presence of a ceric salt which is soluble in at least one component of the reaction mixture. Reference is hereby made to application Serial No. 623,556, filed November 21, 1956, and application Serial No. 628,212, filed December 14, 1956, wherein is disclosed the generic concept of processes relating to the reacting of a compound containing a polymerizable $CH_2=CH<$ group with reducing agents containing a

group wherein X is a member of the group consisting of OH, RCO, SH and NHR; wherein R is a member selected from the group consisting of H, alkyl, aralkyl and aryl, and the products produced by such processes. In distinction thereto, this instant invention is directed to a specific type of polymeric hydroxyl bearing reducing agent, namely cellulose paper which serves as a substrate or backbone for grafting thereon certain specific types of ethylenically unsaturated monomers in such a manner so as to yield unique plastic products having properties similar to certain types of natural leather products such as suede and chamois.

The products obtained in the practice of this invention are useful in many applications wherein pliant grades of leather or leather substitutes are employed; for example, shoes, upholstery, personal accessories, toys, etc. Like the types of natural leathers referred to, the products of this invention are porous and flexible. In addition to these properties which are similar to those possessed by their natural leather counterparts, the products of this invention are inherently water repellent and because of their particular chemical nature, they are less prone to mildew attack, rot, and acid and alkali attack. The products of this invention are dyeable, and treating in this manner results in very decorative leather-like materials useful in the applications mentioned above among others.

One of the objects of this invention is to provide novel plastic products and methods for their preparation.

Another object is to prepare a self-supporting class of sheet products exhibiting properties similar to certain natural leather forms and which may serve as synthetic substitutes therefor.

A still further object of this invention is to graft certain acrylic acid esters onto a polymeric hydroxyl bearing component consisting essentially of cellulose paper in the presence of a ceric salt. These and other objects of this invention will become more readily apparent to those skilled in the art from the discussion which follows and the specific examples which are set forth hereinbelow.

In the practice of the process of this invention, the graft polymerization reaction is carried out in an aqueous system. This aqueous system may either be a solution of the particular monomer employed in water or a system wherein a portion of the monomer is dissolved in water and the amount of monomer which exceeds the solubility limits of the particular operating or reacting conditions of temperature and pressure is in a dispersed and/or emulsified state. While it is entirely feasible to obtain a considerable amount of grafting of the monomer onto the cellulose substrate, that is, to the extent contemplated in this invention when operating with an aqueous solution of the monomer, nevertheless, from the standpoint of an optimum operating consideration, an emulsion or dispersed system is preferred.

When practicing the instant invention in an aqueous emulsion system, a number of emulsifying agents may be employed to effect emulsification of the monomer-water system. These agents include the cationic, anionic and non-ionic types many of which are known in the prior art. Patents 2,028,091 and 2,500,122 are illustrative of some of the types of emulsifiers that may be used. Some of the anionic-non-ionic type agents give emulsions which may tend to be unstable in highly acidic systems particularly when operating in low pH ranges in the order of 1 and 2. When it is desired to operate under such pH conditions, it may be desirable to resort to the use of cationic type emulsifying agents which generally promote excellent emulsion stability characteristics in very low pH systems. Also, it is preferred that the use of emulsification aids having functional groups such as primary amine groups, hydroxyl groups and the like be avoided. The various n-alkyl trimethyl ammonium chlorides have been found to be excellent in preparing emulsions having stability in very low pH ranges. The amounts of emulsifying agent required to effect suitable emulsion characteristics are readily known by those skilled in the art. However, the examples which are given hereinbelow adequately disclose the conventional range of amounts that may be employed in addition to various emulsification effecting techniques.

The process of the present invention may be carried out at temperatures between about —5° C. and 100° C. but preferably at temperatures between about 10° C. and 60° C. Temperatures significantly above 70° C. are to be avoided because the hydroxyl groups of the cellulose paper and the ceric salts used herein constitute a redox system which is prone to decompose too rapidly at these elevated temperatures.

The process of the present invention may be carried out under pressure or under partial vacuum, but it is preferred to utilize atmospheric pressure inasmuch as the reaction runs very favorably at this pressure.

The graft polymerization reaction is carried out in an acidic aqueous medium. The pH of said medium may be any value up to and including 3.5. For optimum results, it is preferred that the pH value be maintained between 1 and 2. Suitable acids for obtaining the pH ranges stated above are adequately shown in the specific examples shown below.

The amount of ceric compound which is utilized in the practice of the process of the present invention may be varied over fairly wide limits. For example, one may utilize from about $10^{-6}$ to $10^{-1}$ mole of ceric ion per mole of polymerizable monomer. Preferably, one would use between $10^{-3}$ to $10^{-2}$ mole of ceric ion per mole of polymerizable monomer. Ceric ion is preferably introduced into the reaction mixture according to the present invention in the form of a ceric salt. Among the salts adapted for use in the present invention are ceric nitrate, ceric sulfate, ceric ammonium nitrate, ceric ammonium sulfate, ceric ammonium pyrophosphate, ceric iodate and the like. These compounds may be employed singly or in combination with one another. Ceric compounds which are capable of forming ceric salts in situ under the acid conditions of the polymerization reaction such as ceric oxide, ceric hydroxide and the like may be used.

The monomers useful in preparing the novel products of this invention are certain alkyl esters of acrylic acid. Specifically, these monomers are ethyl acrylate, propyl acrylate, and butyl acrylate. The various isomeric forms of propyl acrylate and butyl acrylate, namely, isopropyl acrylate, sec-butyl acrylate, tert-butyl acrylate are contemplated herein. Obviously, these monomers may be used singly or in combination. All of the monomeric substances mentioned hereinabove give types of plastic products having the singular properties attributed to the products of this invention.

The cellulose paper substrates suitable and operable in the processes of this invention can be any of the cellulose types. This designation is broadly meant to include paper fabricated from natural cellulose fibers and regenerated cellulose fibers or mixtures thereof. It is possible to employ paper substrates which yield the novel products to which this instant invention relates which contain non-cellulose fibers such as glass, rayon, polyamide (poly hexamethylene-adipamide), polyacrylonitrile and similar synthetic type fibers. However, it is preferred that the amount of non-cellulose fibers of these types does not constitute more than about 20% of the total weight of the paper substrate.

It is also preferred that the cellulose paper substrates to be employed in the practice be reasonably free of substances other than the fibrous material composing the paper. By other substances is meant the various inorganic fillers and water insolubles that may be present in paper. It is not essential that the paper substrate be free of these substances, but desirably so, from an efficiency standpoint in that the inert materials such as inorganic materials do not contribute importantly to the products of this invention and, of course, if these impurities are water soluble, they are leached out by the aqueous medium and in such a manner serve no useful purpose within the reaction system.

It is not necessary that the cellulose paper substrates employed in the practice of this invention be of any particular porosity. Nevertheless, porosity of the paper is important from the standpoint of an efficient processing technique. In other words, porosity of the substrate is an important factor in that the property of porosity allows for the monomers and ceric ions to readily penetrate the interstices of the substrate thereby facilitating the grafting mechanism in that a considerable area of the substrate becomes readily available as potential grafting points. Obviously, there are countless types of fabricated papers varying in thickness and degree of porosity which may be used in the practice of this invention. Therefore, this invention contemplates the use of all these grades of paper to prepare the products of this invention. In the teaching of their contribution to the art, the applicants have found it desirable to use various types of laboratory filter paper. Their choice of this type of cellulose substrate in the disclosure afforded by the specific embodiments of the invention which are presented hereinbelow is a matter of convenience and is not to be construed as a limitation with regard to the grades of cellulose papers to which their invention is applicable.

Referring now specifically to the concept of the present invention, the particular cellulose substrate is suspended in the aqueous media referred to hereinabove and thus serves as a backbone onto which the monomer is grafted. Upon the addition of the ceric salts, and under the pH conditions specified heretofore, the graft polymerization reaction ensues. Theoretically, at least, each hydroxyl group of the cellulose substrate serves as a potential grafting point. It appears, however, that the number of these reactive groups which provide actual graft points is a function of the ceric ion concentration among other factors to wit particular acidity of the system, temperature and monomer concentration.

The grafting mechanism accomplished by the present invention is not a reaction between a carboxyl group of the acrylyl compound and the alcoholic hydroxy group of the cellulose because it is apparent that there are no carboxyl groups in an acrylate ester. The mechanism is rather one in which a potential grafting point on the cellulose substrate is attached to one of the carbons in the acrylate molecule at the double bond positions in a free radical reaction occasioned by the presence of the ceric salt.

Once the grafts are initiated, the polymeric lengths to which they achieve is again a function of monomer concentration, ceric ion concentration, temperature and, in addition, time of reaction.

The amount of pickup, or in other words, the amount of polymeric material chemically attached to the substrate which result in the novel products contemplated by this invention vary over a range. This range can be conveniently expressed in terms of the original dry weight of the cellulose paper substrate. Using such a basis, the pickup amounts contemplated herein range from about 100% to about 900%. However, the preferred amounts range from about 200% to 500%.

As indicated hereinabove, the amount of polymer bonded by interreaction with the cellulose paper substrate is principally the function of a number of variables, namely, temperature of the reaction system, ceric ion concentration, monomer concentration, pH of the system and time of reaction. The specific embodiments set forth below will adequately show those skilled in the art how to practice the process of this invention in obtaining substrates having combined therewith the above-indicated range of polymer pickup.

In order that the concept of the present invention may be more fully understood, the following examples are set forth. These examples are set forth primarily for the purpose of illustration and any specific enumeration of detail contained therein should not be interpreted as a limitation of the case except as is indicated in the appended claims.

*Example 1*

An emulsion was prepared by mixing in a Waring Blendor 180 ml. distilled water, 8.98 grams of n-butyl acrylate and 0.114 gram Arquad 18 (an emulsifying agent sold by Armour and Company containing octadecyl trimethyl ammonium chloride as the active ingredient). This emulsion was added to a suitable reaction vessel, and the system flushed with nitrogen gas. No. 42 Whatman cellulose fiber filter paper having a dry weight of 1.5 grams was then suitably suspended in said reaction mixture. Thereupon, 10 ml. ceric solution (0.1 M $Ce(NH_4)_2(NO_3)_6$, 1 N $HNO_3$) was added to the reaction medium. This system was held for 90 minutes at 25° C. while continually sparging the system gently with pre-purified nitrogen.

After expiration of said holding time, the product was removed and washed thoroughly with water, and dried to constant weight in a forced-draft oven at 220° F. A pickup of monomer in the plastic product obtained amounted to 262%. The polymerized n-butyl acrylate component of the product is principally grafted polymer as evidenced by the finding that the pickup was 211% after extraction of the product with 600 ml. of toluene for 15 hours at 25° C., said toluene being a solvent for homopolymers of n-butyl acrylate.

The thus-obtained product resembles a suede grade or type of leather in appearance and hand properties. It is porous, flexible and water repellent.

Example 2

The conditions of Example 1 were repeated in every substantial detail except that the reaction system was held for 135 minutes at 25° C. Here the monomer pickup amounted to 328%. The graft efficiency under these conditions as evidenced by toluene extraction in the manner outlined in Example 1 was approximately of the same order. The product in this instance exhibited a slightly softer hand than the product obtained in Example 1. The product of this example was substantially as white as the original paper substrate and possessed pleasing supple characteristics.

Example 3

Into a suitable reaction vessel were added 179.8 ml. distilled water, 9.18 grams of inhibitor free n-butyl acrylate. A sample of No. 42 Whatman cellulose fiber paper having a dry weight of 1.61 grams was suitably suspended within said aqueous-monomer system. Thereupon, 10 ml. ceric solution (0.1 M $Ce(NH_4)_2(NO_3)_6$, 1 N $HNO_3$) were added. The pH of this reaction medium was 1.0–1.5. The temperature was held at 25° C. while vigorously agitating the reaction medium by passing the therethrough an appropriate stream of pure $CO_2$. The reaction was continued for 30 minutes whereupon the product was removed and dried in a manner indicated in Example 1. The percent pickup in this instance amounted to 127.5. Like the products of Examples 1 and 2, this product was suede-like in nature. This example illustrates the use of a dispersed water-monomer system which is not emulsion system.

Example 4

An emulsion of 180 ml. distilled water with 10 ml. ethyl acrylate employing 0.114 gram Arquad 18 was made in a Waring Blendor. This emulsion was then added to a suitable reaction vessel. A sample of Hurlbut 812 laminating paper (a grade of cellulose fiber paper having slight wet strength properties) having a dry weight of 0.560 gram was immersed in the emulsion. Thereupon, 10 ml. of ceric solution (0.1 M $Ce(NH_4)_2(NO_3)_6$, 1 N $HNO_3$) were added to the system. The reaction was continued for 90 minutes at approximately 25° C. while continually passing a stream of pre-purified nitrogen gas through the reaction medium. The pH of the reaction medium ranged between 1.0–1.5. The resulting reaction product was removed and dried in a manner indicated in Example 1. The amount of graft polyethyl acrylate was 332% based upon the original dry weight of the paper substrate employed. This product exhibited very flexible, soft hand properties.

Example 5

An emulsion was prepared by mixing in a Waring Blendor 180 ml. distilled water, 8.98 grams of n-propyl acrylate and 0.114 gram Arquad 18 (an emulsifier containing octadecyl trimethyl ammonium chloride at 50% solids). This emulsion was added to a suitable reaction vessel, and the system flushed with pure nitrogen gas. Thereupon, 10 ml. ceric solution (0.1 M $Ce(NH_4)_2(NO_3)_6$, 1 N $HNO_3$)

was added to the reaction medium. No. 42 Whatman cellulose fiber filter paper having a dry weight of 1.5 grams was suitably suspended in said reaction mixture. This system was held for 90 minutes at 25° C. while continually sparging the system gently with pre-purified nitrogen. The product was removed from the reaction medium and washed and dried to a constant weight in a forced-draft oven at 220° F. The amount of pickup amounted to 175%. The product possessed a degree of whiteness comparable to the original substrate and had a slightly pebblish surface. It was semi-flexible in nature resembling a suede grade of leather.

Example 6

An emulsion was prepared in the following manner. 8990 ml. distilled water were added to a 12-quart battery jar. After flushing with $CO_2$ for 5 minutes, 5.75 grams of Arquad 18 and 510 ml. butyl acrylate were added. This system was then mixed with an Eppenbach Homomixer for 3 minutes. The resultant emulsion was flushed with $CO_2$ for 1 hour following the preparation thereof. This emulsion was then transferred to a suitable reaction vessel and a 6' x 6" strip of Hurlbut 812 paper (15.32 grams dry weight) was suitably arranged in the emulsion. Thereupon, 500 ml. of ceric solution (0.1 M $Ce(NH_4)_2(NO_3)_6$, 1 N $HNO_3$)

were added to the reaction medium. The paper substrate was held within said reaction medium for 60 minutes at a temperature of 22.5° C. The pH of the reaction medium was 1.0–1.5. $CO_2$ gas was continuously passed through the reaction medium during this time of immersion. The product was then removed and dried in a manner previously indicated. The pickup of poly n-butyl acrylate in this instance amounted to 501%. The product exhibited very flexible and soft qualities very much like a chamois grade of leather.

Example 7

8990 ml. distilled water, 510 ml. of butyl acrylate and 5.75 grams of Arquad 18 were emulsified in a conventional manner as indicated in previous examples. A sample of Hurlbut 812 laminating paper having a dry weight of 14.36 grams, was immersed in the emulsion. 500 ml. ceric solution (0.1 M $Ce(NH_4)_2(NO_3)_6$, 1 N $HNO_3$) were then added. The pH of the reaction system was 1.0–1.5. The paper substrate was held immersed for 52 minutes. The temperature of the reaction medium was 23° C. throughout the period of immersion. The reaction product was removed and dried. The amount of pickup was 846%. The product of this example possessed a very pale lemon color and was extremely pliable in nature. The hand properties of this product was similar to a fine grade of chamois.

Example 8

An emulsion was prepared from 8990 ml. distilled water, 510 ml. butyl acrylate and 5.75 grams Arquad 18. Immersed therein was a 10' x 8" sample of Hurlbut 812 paper having a dry weight of 33.41 grams. Thereupon, 500 ml. ceric solution (0.1 M $Ce(NH_4)_2(NH_3)_6$, 1 N $HNO_3$) were added. The reaction medium was held at 24° C. during the period of immersion. The period of immersion was 120 minutes. After said period, the product was removed and dried. The amount of pickup was in the order of 176%. As compared with Example 6, this instant example primarily illustrates the effect of monomer and ceric ion concentration. Because of the weight of the paper substrate employed in this particular example, the effective ceric ion and monomer concentration (in relationship with the graft substrate) is approximately 50%.

We claim:

1. A process for chemically modifying paper comprising reacting a compound selected from the group consisting of ethyl acrylate, propyl acrylate and butyl acrylate with a paper substrate composed predominantly of cellulose fibers in an aqueous medium at a pH not greater than 3.5 in the presence of a ceric salt which is soluble in at least one component of the reaction medium until the weight of the said acrylate combined with said substrate is between about 100% and 900% based on the weight of the substrate.

2. A process for chemically modifying paper comprising reacting a compound selected from the group consisting of ethyl acrylate, propyl acrylate and butyl acrylate with a paper substrate composed predominantly of cellulose fibers in an aqueous emulsion medium at a pH not greater than 3.5 in the presence of a ceric salt which is soluble in at least one component of the reaction medium until the weight of the said acrylate combined with said substrate is between about 100% and 900% based on the weight of the substrate.

3. A process for chemically modifying paper comprising reacting n-butyl acrylate with a paper substrate composed predominantly of cellulose paper in an aqueous emulsion medium at a pH not greater than 3.5 in the presence of a ceric salt which is soluble in at least one component of the reaction medium until the weight of the said acrylate combined with said substrate is between about 100% and 900% based on the weight of the substrate.

4. A process for chemically modifying paper comprising reacting sec-butyl acrylate with a paper substrate composed predominantly of cellulose paper in an aqueous emulsion medium at a pH not greater than 3.5 in the presence of a ceric salt which is soluble in at least one component of the reaction medium until the weight of the said acrylate combined with said substrate is between about 100% and 900% based on the weight of the substrate.

5. A process for chemically modifying paper comprising reacting n-propyl acrylate with a paper substrate composed predominantly of cellulose paper in an aqueous emulsion medium at a pH not greater than 3.5 in the presence of a ceric salt which is soluble in at least one component of the reaction medium until the weight of the said acrylate combined with said substrate is between about 100% and 900% based on the weight of the substrate.

6. A process for chemically modifying paper comprising reacting isopropyl acrylate with a paper substrate composed predominantly of cellulose paper in an aqueous emulsion medium at a pH not greater than 3.5 in the presence of a ceric salt which is soluble in at least one component of the reaction medium until the weight of the said acrylate combined with said substrate is between about 100% and 900% based on the weight of the substrate.

7. A product comprising a paper substrate composed predominantly of cellulose fibers chemically combined with poly n-butyl acrylate, the weight of said poly n-butyl acrylate ranging from between about 100% and 900% based on the weight of the substrate.

8. A product comprising a paper substrate composed predominantly of cellulose fibers chemically combined with poly sec-butyl acrylate, the weight of said poly sec-butyl acrylate ranging from between about 100% and 900% based on the weight of the substrate.

9. A product comprising a paper substrate composed predominantly of cellulose fibers chemically combined with poly n-propyl acrylate, the weight of said poly n-propyl acrylate ranging from between about 100% and 900% based on the weight of the substrate.

10. A product comprising a paper substrate composed predominantly of cellulose fibers chemically combined with a polymer of a compound selected from the group consisting of ethyl acrylate, propyl acrylate and butyl acrylate, the weight of said polymer ranging from between about 100% and 900% based on the weight of the substrate.

References Cited in the file of this patent

UNITED STATES PATENTS

| | | |
|---|---|---|
| 2,594,560 | Howard | Apr. 29, 1952 |
| 2,765,229 | McLaughlin | Oct. 2, 1956 |
| 2,789,030 | Fetscher | Apr. 16, 1957 |

UNITED STATES PATENT OFFICE
CERTIFICATION OF CORRECTION

Patent No. 2,955,015                                October 4, 1960

Nicholas R. Segro et al.

It is hereby certified that error appears in the above numbered patent requiring correction and that the said Letters Patent should read as corrected below.

Column 1, line 22, for "interaction" read -- interreaction --; column 5, line 37, after "not" insert -- an --.

Signed and sealed this 27th day of June 1961.

(SEAL)
Attest:

ERNEST W. SWIDER
Attesting Officer

DAVID L. LADD
Commissioner of Patents